(12) United States Patent
Abe (10) Patent No.: US 7,386,068 B2
(45) Date of Patent: Jun. 10, 2008

(54) DECODER AND RECEIVER

(75) Inventor: Masahiro Abe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 665 days.

(21) Appl. No.: 11/001,324

(22) Filed: Dec. 2, 2004

(65) Prior Publication Data

US 2005/0163260 A1 Jul. 28, 2005

(30) Foreign Application Priority Data

Dec. 3, 2003 (JP) ............................. 2003-404701

(51) Int. Cl.
*H04L 27/06* (2006.01)
(52) U.S. Cl. ...................................... 375/341; 375/262
(58) Field of Classification Search ................ 375/262, 375/265, 341, 232, 235; 714/786, 792, 795
See application file for complete search history.

(56) References Cited

U.S. PATENT DOCUMENTS

| 5,577,068 | A | * | 11/1996 | Bottomley et al. | ......... | 375/232 |
| 6,639,954 | B2 | * | 10/2003 | Kuroiwa et al. | ............ | 375/341 |
| 6,737,995 | B2 | * | 5/2004 | Ng et al. | ....................... | 341/68 |
| 2003/0091129 | A1 | * | 5/2003 | Zhang et al. | ................ | 375/340 |

FOREIGN PATENT DOCUMENTS

| JP | 63-122323 | 5/1988 |
| JP | 5-183450 | 7/1993 |
| JP | 5-244017 | 9/1993 |
| JP | 6-29951 | 2/1994 |
| JP | 7-57394 | 3/1995 |
| JP | 7-93914 | 4/1995 |
| JP | 8-32632 | 2/1996 |
| JP | 8-204768 | 8/1996 |
| JP | 8-317006 | 11/1996 |
| JP | 2000-228657 | 8/2000 |
| JP | 2001-273719 | 10/2001 |
| JP | 2002-50969 | 2/2002 |
| JP | 2003-134082 | 5/2003 |
| JP | 2003-338851 | 11/2003 |

* cited by examiner

*Primary Examiner*—Khanh C. Tran
(74) *Attorney, Agent, or Firm*—Oblon, Spivak, McClelland, Maier & Neustadt, P.C.

(57) ABSTRACT

According to an aspect of the present invention, there is provided a decoder for decoding a demodulated signal that has been subjected to a CDM demodulation, the decoder comprising a Viterbi decoding section that subjects a convolutional code to a soft decision Viterbi decoding; a soft decision data acquisition section that acquires soft decision data corresponding to a interval to which the demodulated signal belongs, using soft decision information in which a plurality of intervals obtained by dividing between a highest level and a lowest level according to a plurality of thresholds correspond to pieces of soft decision data to be input to the Viterbi decoding section, respectively; and a threshold changing section that determines whether a situation of a transmission line is suitable, and that changes threshold intervals in the soft decision information if the state of the transmission line does not satisfy a predetermined reference.

20 Claims, 6 Drawing Sheets

DECODER AND RECEIVER

CROSS-REFERENCE TO RELATED APPLICATIONS

This application claims the benefit of priority under 35USC § 119 to Japanese Patent Application No. 2003-404701 filed on Dec. 3, 2003, the entire contents of which are incorporated herein by reference.

BACKGROUND OF THE INVENTION

1. Field of the Invention

The present invention relates to a decoder and a receiver employed in a satellite broadcasting system, a satellite communication system, a terrestrial broadcasting system, a terrestrial communication system, or the like.

2. Related Art

A receiver in a satellite broadcasting system, a satellite communication system, a terrestrial broadcasting system, or a terrestrial communication system using code division multiplex access (CDMA) down-converts a signal of a radio frequency (RF) received from a transmitting station, and subjects the down-converted received signal to a code division multiplex (CDM) demodulation. The receiver calculates soft decision data (multivalued input level) to be input to a Viterbi decoder based on a CDM-demodulated signal. More specifically, the receiver calculates the soft decision data by applying the demodulated signal for a soft decision table (soft decision information) in which intervals obtained by dividing between a highest level and a lowest level according to a plurality of thresholds corresponds to pieces of soft decision data. The Viterbi decoder in the receiver performs a Viterbi decoding based on a Viterbi algorithm using the calculated soft decision data.

The conventional receiver has, however, the following disadvantages. Since each threshold interval is fixed in the soft decision table, an optimum coding gain is not always obtained on a low-quality line (e.g., in case of great influence by fading or in case of many multipaths).

BRIEF SUMMARY OF THE INVENTION

According to a first aspect of the present invention, there is provided a decoder for decoding a demodulated signal that has been subjected to a code division multiplex (CDM) demodulation, the decoder comprising: a Viterbi decoding section that subjects a convolutional code to a soft decision Viterbi decoding; a soft decision data acquisition section that acquires soft decision data corresponding to a interval to which the demodulated signal belongs, using soft decision information in which a plurality of intervals obtained by dividing between a highest level and a lowest level according to a plurality of thresholds correspond to pieces of soft decision data to be input to the Viterbi decoding section, respectively; and a threshold changing section that determines whether a situation of a transmission line is suitable, and that changes threshold intervals in the soft decision information if the state of the transmission line does not satisfy a predetermined reference.

According to a second aspect of the present invention, there is provided a receiver comprising: a code division multiplex (CDM) demodulation section that demodulates a CDM-modulated signal and that outputs a demodulated signal; a Viterbi decoding section that subjects a convolutional code to a soft decision Viterbi decoding; a soft decision data acquisition section that acquires soft decision data corresponding to a interval to which the demodulated signal belongs, using soft decision information in which a plurality of intervals obtained by dividing between a highest level and a lowest level according to a plurality of thresholds correspond to pieces of soft decision data to be input to the Viterbi decoding section, respectively; and a threshold changing section that determines whether a situation of a transmission line is suitable, and that changes threshold intervals in the soft decision information if the state of the transmission line does not satisfy a predetermined reference.

According to a third aspect of the present invention, there is provided A decoder for decoding a demodulated signal that has been subjected to a code division multiplex (CDM) demodulation, the decoder comprising: a Viterbi decoding section that subjects a convolutional code to a soft decision Viterbi decoding; a soft decision data acquisition section that acquires soft decision data corresponding to a interval to which the demodulated signal belongs, using soft decision information in which a plurality of intervals obtained by dividing between a highest level and a lowest level according to a plurality of thresholds correspond to pieces of soft decision data to be input to the Viterbi decoding section, respectively; and a threshold change request section that determines whether a situation of a transmission line is suitable, that issues a request to execute a new calculation of threshold intervals if the situation of the transmission line does not satisfy a predetermined reference, and that changes the threshold intervals in the soft decision information based on a calculation result if receiving the calculation result in response to the request.

DETAILED DESCRIPTION OF THE INVENTION

Figure 1:
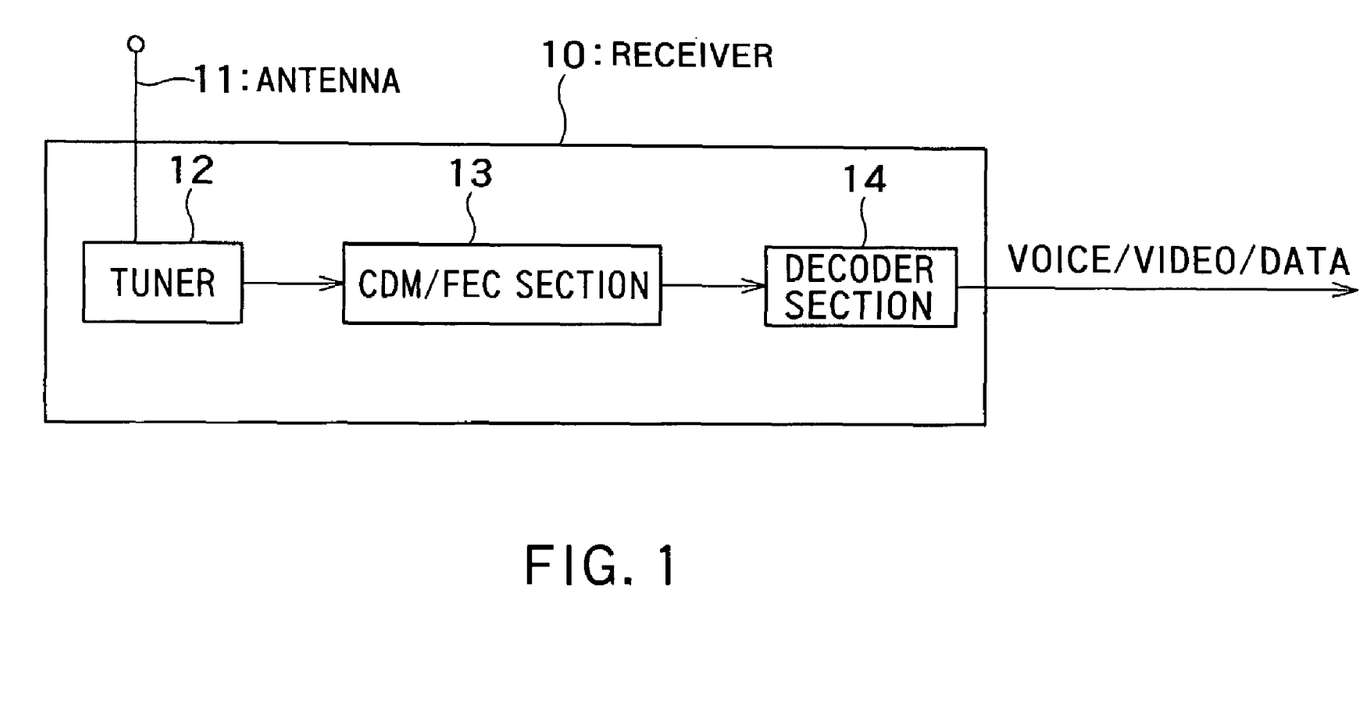
FIG. 1 is a schematic block diagram that depicts a configuration of a receiver according to an embodiment of the present invention.

FIG. 1 is a schematic block diagram that depicts a configuration of a receiver 10 according to an embodiment of the present invention.

Figure 2:
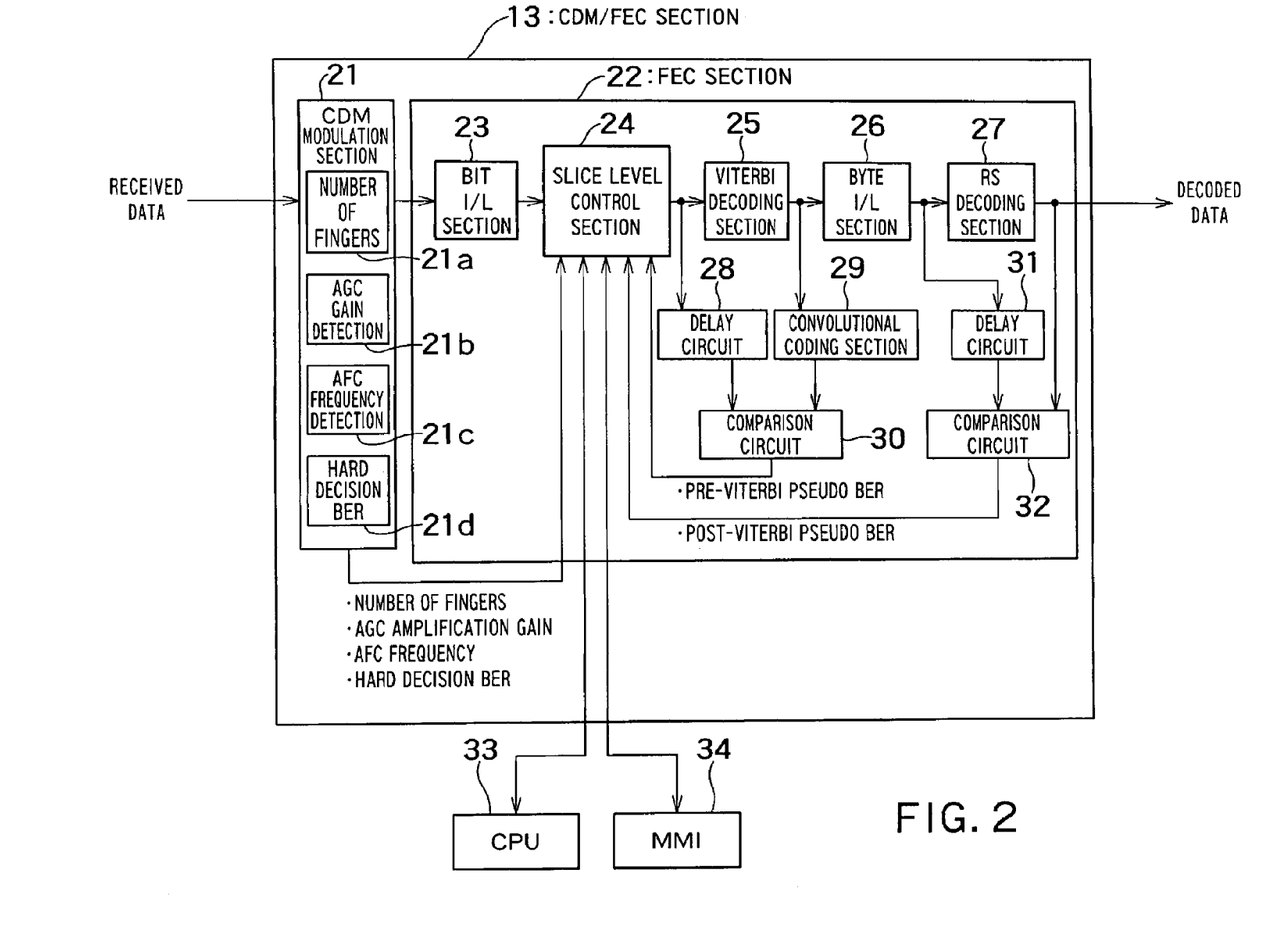
FIG. 2 is a block diagram that depicts a detailed configuration of a CDM/FEC in the receiver.

FIG. 2 is a block diagram that depicts a detailed configuration of a CDM/FEC section 13 in this receiver 10.

Figure 3:
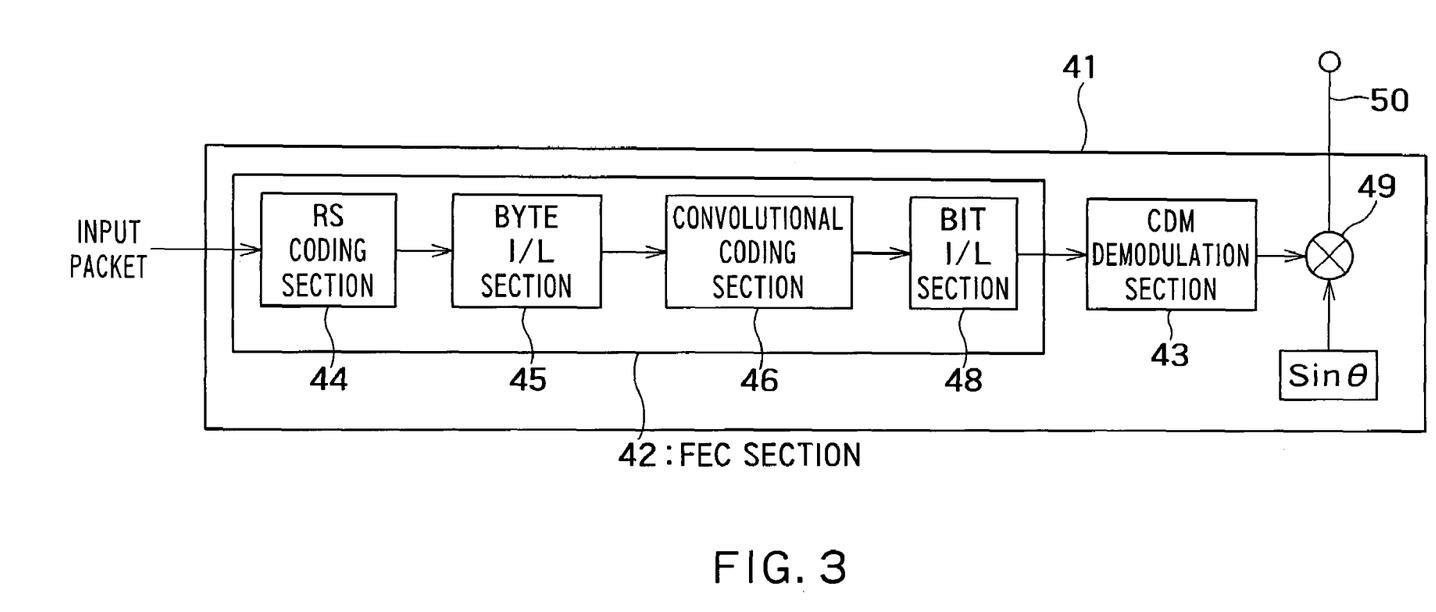
FIG. 3 is a schematic block diagram that depicts a configuration of a transmitter.

FIG. 3 is a block diagram that depicts a configuration of a transmitter 41 corresponding to the receiver 10 shown in FIG. 1.

The transmitter 41 will first be described, and the receiver 10 will then be described.

As shown in FIG. 3, the transmitter 41 includes a forward error correction ("FEC") section 42 that executes an error correction coding to an input packet, a CDM modulation section 43 that CDM-modulates an output signal (error correction coded signal) from the FEC section 42, and a frequency conversion section 49 that converts an output signal from the CDM modulation section 43 into a radio frequency band signal, and that outputs the radio frequency band signal from an antenna 50.

In the FEC section 42, a Reed Solomon ("RS") coding section 44 generates an RS code obtained by adding error correction redundant bits to the input packet. For example, the RS coding section 44 adds redundant bits of 16 bytes to an input packet of 188 bytes.

A byte interleave (hereinafter "I/L") section 45 conducts a byte interleave to the RS code generated by the RS coding section 44 according to a byte interleave rule so as to enhance an error detection accuracy at a receiving end.

A convolutional coding section 46 converts an output signal from the byte I/L section 45 into a convolutional code. Namely, the convolutional coding section 46 generates an n-bit convolutional code (where n>K) at intervals of k bits of an input signal. For example, at k=1 and n=2, the convolutional coding section 46 generates a 2-bit convolutional code at one-bit intervals of the input signal.

A bit I/L section 48 conducts a bit interleave to an output signal from the convolutional coding section 46 according to a bit interleave rule so as to enhance the error detection accuracy at the receiving end.

The CDM modulation section 43 performs a CDM modulation using an output signal from the bit I/L section 48. More specifically, the CDM modulation section 43 performs a primary modulation (e.g., QPSK modulation or BPSK modulation) using the output signal from the bit I/L section 48, and then subjects the signal that has been subjected to the primary modulation (narrow-band signal) to a spectrum spreading modulation (secondary modulation) using a spreading code.

The frequency conversion section 49 converts the spectrum-spread signal (wideband signal) that has been subjected to the secondary modulation by the CDM modulation section 43 into a signal of a radio frequency, and outputs the radio frequency signal from the antenna 50.

The radio frequency signal output from the antenna 50 is transmitted to the receiver 10 over, for example, a satellite communication. A radio wave may be transmitted to the receiver 10 either through a gap filler ("GF") or directly from a terrestrial transmitting station.

The receiver 10 will next be described.

As shown in FIG. 1, a tuner 12 included in the receiver 10 receives the radio frequency signal transmitted from the transmitter 41 through an antenna 11, and down-converts (frequency-converts) the received radio frequency signal using an oscillation signal supplied from an oscillator (not shown). A oscillation frequency of the oscillation signal from this oscillator is controlled by a known automatic frequency control ("AFC") circuit (not shown). The AFC circuit controls the oscillator based on the radio frequency. The tuner 12 controls (gain-controls) a power level of the down-converted signal to be constant using a known automatic gain control ("AGC") circuit (not shown), and outputs the resultant signal.

A CDM/FEC section 13 CDM-demodulates an output signal from the tuner 12. More specifically, the CDM/FEC section 13 specifies a code necessary for despreading, multiplies the output signal from the tuner 12 by the specified code, and thereby demodulates the spread signal to a narrow-band signal (a primary demodulation). The CDM/FEC section 13 subjects the obtained narrow-band signal to a demodulation (a secondary demodulation) corresponding to the primary modulation. If the QPSK modulation is performed as the primary modulation, for example, the CDM/FEC section 13 performs a QPSK demodulation. If the BPSK modulation is performed, the CDM/FEC section 13 performs a BPSK demodulation. The CDM/FEC section 13 subjects the secondary-demodulated signal to a Viterbi decoding and further an RS decoding.

A decoder section 14 decodes an output signal (a decoded signal) from the CDM/FEC section 13. Namely, if the decoded signal is voice information, the decoder section 14 reproduces the voice information through a loudspeaker (not shown). If the decoded signal is video information, the decoder section 14 reproduces the video information on a display section (not shown). If the decoded signal is data information such as characters, the decoder section 14 displays the data information on the display section (not shown).

Referring to FIG. 2, the CDM/FEC section 13 will be described in more detail.

In the CDM/FEC section 13, a CDM demodulation section 21 CDM-demodulates the signal input from the tuner 12 (performs the primary demodulation and the secondary demodulation on the signal). In the secondary demodulation, the CDM demodulation section 21 generates a bit string (demodulated signal) for one bit or each of a plurality of bits allocated to one symbol based on a position of the signal (one symbol) after the primary demodulation on an IQ constellation, and outputs the generated bit string. If the QPSK demodulation is performed as the secondary demodulation, for example, 2 bits are allocated to one symbol. Therefore, the CDM demodulation section 21 generates 2 bit strings (demodulated signals) per symbol. The demodulated signal (the bit string) is an 8-bit signal having a value of, for example, $-128$ ($10000000_2$) to $+127$ ($01111111_2$).

A number-of-fingers detection section 21a in the CDM demodulation section 21 detects the number of fingers (the number of paths combined by a RAKE combiner). Normally, it is estimated that the greater the number of fingers is, the more the multipaths are.

An AGC gain (amplification) detection section 21b detects an gain of the signal the power level of which is adjusted by the AGC circuit.

An AFC frequency detection section 21c detects an oscillation frequency (AFC frequency) of the oscillator controlled by the AFC circuit.

A hard decision bit error rate (BER) calculation section 21d subjects the narrow-band signal that has been subjected to the primary demodulation (despreading) to a hard decision demodulation for each symbol, and generates a hard decision signal. This hard decision signal may be obtained by conducting a hard decision to the demodulated signal based on a highest bit of the demodulated signal. That is, the hard decision signal is a signal composed only by the sign bit of the demodulated signal. The hard decision BER calculation section 21d calculates a bit error rate (a hard decision BER) by comparing the generated hard decision signals with a bit pattern given in advance. The hard decision BER calculation section 21d will be described below in more detail.

Examples of a channel normally used in CDMA transmission include an information channel for transmitting user information and a control information channel (pilot channel) for transmitting control information. The latter pilot channel is allocated a bit pattern such as a synchronization bit (continuous wave or CW) or a unique word (UW). This bit pattern is known to the receiving end. The hard decision BER calculation section 21d compares this known bit pattern with the hard decision signals obtained by subjecting the demodulated signal on the pilot channel to the hard decision, and calculates the hard decision BER. It is noted herein that the bit pattern of the pilot channel is not subjected to the convolutional coding and the RS coding at the transmission end.

As shown in FIG. 2, the number-of-fingers detection section 21a, the AGC gain detection section 21b, the AFC frequency detection section 21c, and the hard decision BER calculation section 21d output the number of fingers, the AGC gain, the AFC frequency, and the hard decision BER thus obtained to a slice level control section 24, respectively.

A bit I/L section 23 conducts a bit de-interleave to the demodulated signal (bit strings) output from the CDM demodulation section 21 according to a bit de-interleave rule.

Figure 4:
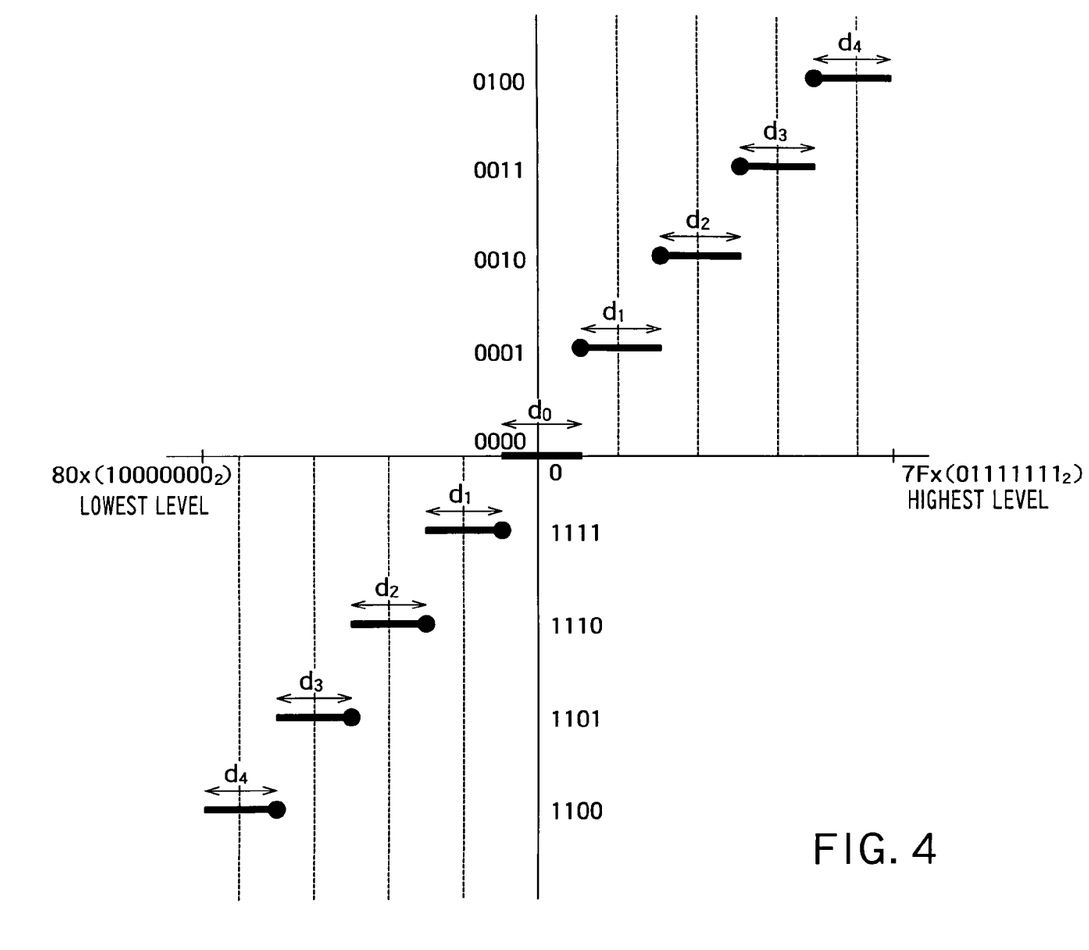
FIG. 4 depicts one example of a soft decision table.

The slice level control section 24 calculates soft decision data (multivalued input level), to be input to a Viterbi decoding section 25, based on a soft decision table shown in FIG. 4 for each symbol (each bit string) (one symbol is composed by 8 bits and includes values −128 to +127 in this embodiment) of an output signal from the bit I/L section 23.

As shown in FIG. 4, this soft decision table is provided to calculate the soft decision data (refer to a vertical axis of the table), to be input to the Viterbi decoding section 25, composed by 4 bits among −4 ($1100_2$) to 4 ($0100_2$) including an intermediate value 0, from the value of one symbol (−128 ($10000000_2$) to +127 ($01111111_2$)) (refer to a horizontal axis of the table) input from the bit I/L section 23. Namely, information having a large bit width such as 8-bit requires a large memory size for a bit de-interleave, and if the information is to be processed by the Viterbi decoding section 25 as it is, a circuit scale is made extremely large. In addition, a longer signal delay time is generated in the FEC section 22 accompanying a high calculation load, and a processing rate required in the FEC section 22 cannot be satisfied. To lessen the memory size's increasing and the calculation load, therefore, the number of bits of the 8-bit signal is reduced to, for example, 4 and is input to the Viterbi decoding section 25. In FIG. 4, sign forms of binary number shown in the horizontal axis and the vertical axis are complements for 2. In this embodiment, the number of bits of the soft decision data is 4. However, the present invention is not limited to this, and the number of bits of the soft decision data may be, for example, 3, 5 or the like.

In FIG. 4, slice levels d0, d1(1) to d4(1), and d1(2) to d4(2) make a plurality of intervals obtained by dividing the horizontal axis according to a plurality of thresholds correspond to pieces of soft decision data, respectively. The respective slice levels are stored in, for example, a register included in the slice level control section 24. In FIG. 4, the slice levels are equal in width (threshold interval). As will be described later, in this embodiment, the slice level width (threshold interval) can be changed according to a reception situation (reception quality). The polarity (i.e., sign bit) of the value of the soft decision data (on the vertical axis) represents the logic "0" (at the positive polarity) or the logic "1" (at the negative polarity).

Referring back to FIG. 2, the Viterbi decoding section 25 receives the soft decision data generated by the slice level control section 24, and performs a Viterbi decoding based on the input soft decision data. Namely, the Viterbi decoding section 25 outputs a one-bit signal for two pieces of soft decision data (8 bits in all) input from the slice level control section 24.

A byte I/L section 26 conducts a byte de-interleave to the Viterbi-decoded signal output from the Viterbi decoding section 25 according to a byte de-interleave rule.

An RS decoding section 27 conducts an RS decoding to the signal output from the byte I/L section 26 based on the redundant bit in the RS code. The RS decoding section 27 outputs the resultant RS-decoded signal to a comparison circuit 32 and the decoder section 14 (shown in FIG. 1).

A convolutional coding section 29 conducts a convolutional coding to the Viterbi-decoded signal output from the Viterbi decoding section 25 again, and outputs the resultant signal to the comparison circuit 30. The convolutional coding section 29 outputs, for example, a 2-bit signal for one-bit input.

A delay circuit 28 receives the logic value (highest bit) of the soft decision data generated by the slice level control section 24, that is, the signal obtained as a result of conducting the hard decision to each soft decision data by the sign bit. Accordingly, the one-bit signal is input to the delay circuit 28 per a piece of soft decision data. This hard decision is conducted by, for example, the slice level control section 24. The delay circuit 28 outputs the input signal to the comparison circuit 30 synchronously with the signal output from the convolutional coding section 29. Namely, the delay circuit 28 temporarily holds the received signal while the Viterbi decoding section 25 and the convolutional coding section 29 are performing their processings.

The comparison circuit 30 compares bit values of the signals input from the convolutional coding section 29 and the delay circuit 28 with each other, and calculates a bit error rate (pre-Viterbi pseudo BER). That is, the comparison circuit 30 examines a correlation between the signal before the Viterbi decoding and the signal after the Viterbi decoding. The BER signifies the number of different bits between the two signals per, for example, second. If the BER is high, this means that many errors have occurred on a transmission line. The comparison circuit 30 outputs the calculated BER (pre-Viterbi pseudo BER) to the slice level control section 24.

A signal sequence obtained by eliminating redundant bits from the signal sequence (RS code sequence) output from the byte I/L section 26 is input to a delay circuit 31. The delay circuit 31 outputs the input signal sequence to a comparison circuit 32 synchronously with an output signal from the RS decoding section 27. Namely, the delay circuit 31 temporarily holds the signal sequence input from the byte I/L section 26 while the RS decoding section 27 is performing its processing.

The comparison circuit 32 compares the signal sequence input from the delay circuit 31 with the signal sequence input from the RS decoding section 27, and calculates a BER (post-Viterbi pseudo BER). That is, the comparison circuit 32 examines a correlation between the signal sequence before the RS decoding and the signal sequence after the RS decoding. The BER signifies the number of different bits between the two signal sequences per, for example, second. If the BER is high, this means that many errors that cannot be completely corrected by the Viterbi decoding and the RS decoding has occurred on the transmission line. The comparison circuit 32 outputs the calculated BER (post-Viterbi pseudo BER) to the slice level control section 24.

The slice level control section 24 determines a situation of the transmission line based on the number of fingers, the AGC gain, the AFC frequency, the hard decision BER, the pre-Viterbi pseudo BER, and the post-Viterbi pseudo BER. If determining that the situation of the transmission line is bad (the situation of the transmission line does not satisfy a predetermined level), the slice level control section 24 changes the slice level width (threshold interval).

A slice level width change processing performed by the slice level control section 24 will be described. It is noted, however, that the following description is given as one example and that the present invention is not limited to the following content.

Figure 5:
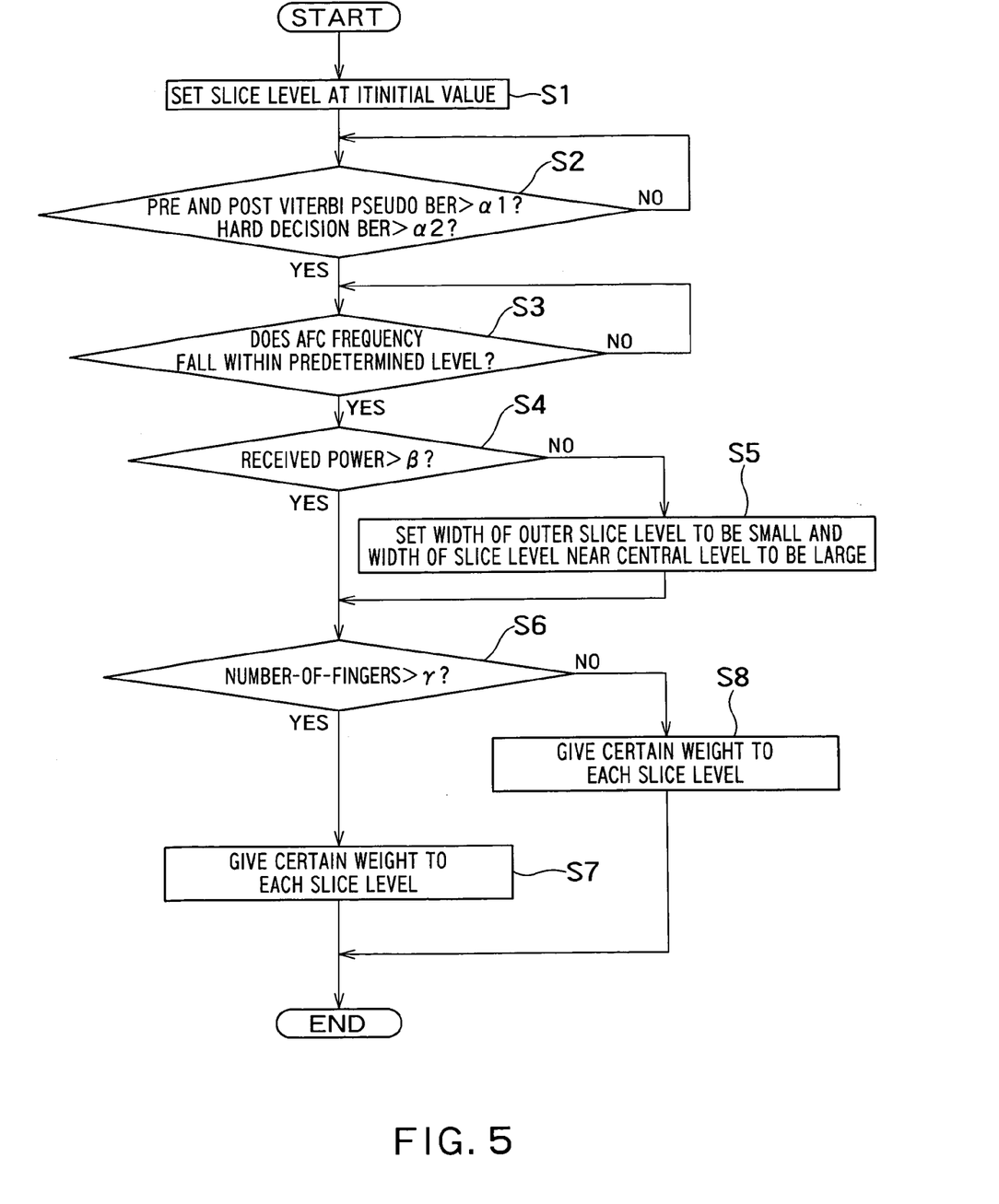
FIG. 5 is a flowchart that depicts a flow of a slice level width change processing.

FIG. 5 is a flowchart that depicts a flow of the slice level width change processing performed by the slice level control section 24.

At a step S1, the slice level control section 24 sets a width of each slice level (each threshold interval) at an initial value. For example, the slice level control section 24 sets the widths of all the slice levels from the highest level to the lowest level to be equal (refer to FIG. 4).

At a step S2, the slice level control section 24 determines whether a present reception situation is considered to be error free, that is, whether the pre-Viterbi pseudo BER and the post-Viterbi pseudo BER are equal to or lower than a certain level α1 based on the pre-Viterbi pseudo BER and the post-Viterbi pseudo BER input from the comparison circuits 30 and 32, respectively. At the step S2, the slice level control section 24 also determines whether the hard decision BER calculated by the hard decision BER calculation section 21d is equal to or lower than a certain level α2.

If both of the pre-Viterbi pseudo BER and the post-Viterbi pseudo BER are equal to or lower than the certain level α1 and the hard decision BER is equal to or lower than the certain level α2 ("NO" at the step S2), then the slice level control section 24 determines that a reception quality is proper and does not change the slice level widths.

If one of the pre-Viterbi pseudo BER and the post-Viterbi pseudo BER is higher than the certain level α1 or the hard decision BER is higher than the certain level α2 ("YES" at the step S2), then the slice level control section 24 determines whether the AFC frequency detected by the AFC frequency detection section 21c falls within a predetermined level (at a step S3).

If the AFC frequency falls within the predetermined level ("YES" at the step S3), the slice level control section 24 goes to a next step S4. If the AFC frequency does not fall within the predetermined level ("NO" at the step S3), the slice level control section 24 determines that it is difficult to perform the CDM demodulation at present, and waits until the AFC frequency falls within the predetermined level.

At a step S4, the slice level control section 24 determines whether the AGC gain detected by the AGC gain detection section 21b falls within a predetermined level, that is, a received power is higher than a certain level β.

If the received signal power is equal to or lower than the certain level β, that is, a carrier power-to-noise power ratio (C/N) is estimated to be lowered by a reduction in the received power ("NO" at the step S4), the slice level control section 24 gives a certain weight to the width of each slice level. For example, the slice level control section 24 gives a weight to the width of each slice level so that the width is smaller when the slice level is closer to the highest level and the lowest level, and largest when the slice level is a central level. In determining the width of each slice level, the AGC gain or the received power may be used. The AFC frequency may be used. The pre-Viterbi pseudo BER, the post-Viterbi pseudo BER, the hard decision BER may be used.

Figure 6:
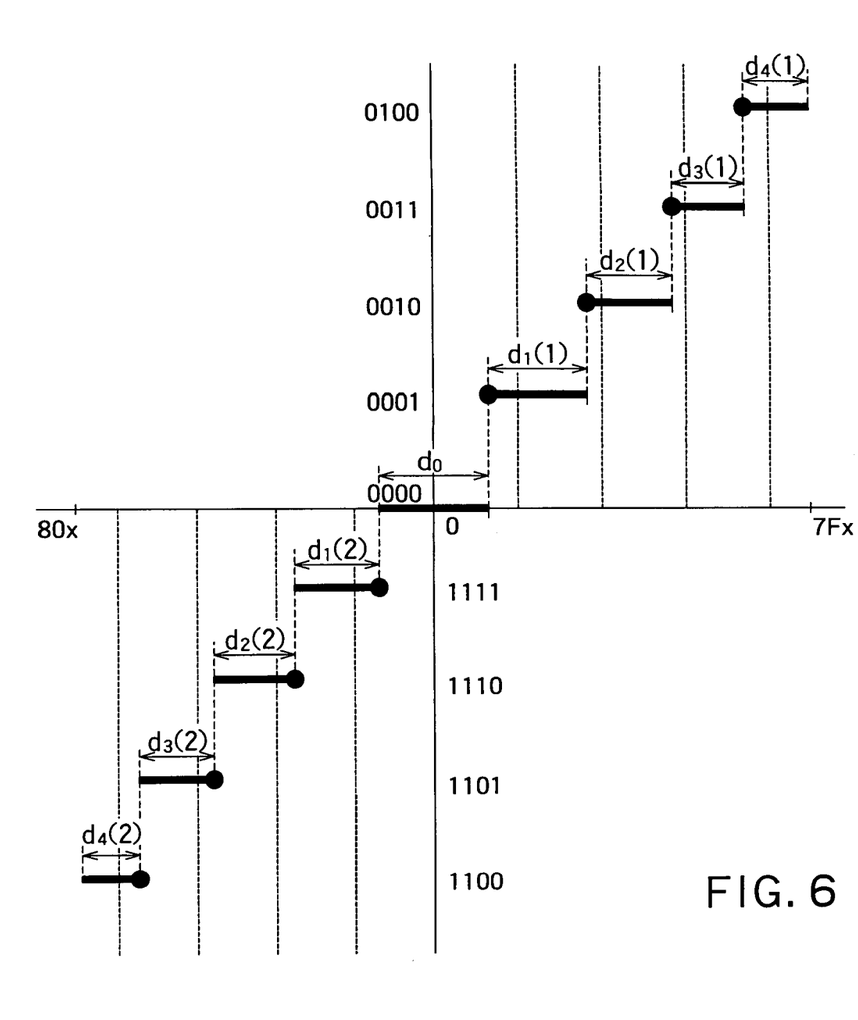
FIG. 6 depicts one example of the soft decision table in which a weight is given to each slice level width (each threshold interval).

FIG. 6 depicts one example in which a weight is given to the width of each slice level (each threshold interval) so that the width is smaller when the slice level is closer to the highest level and the lowest level, and largest when the slice level is in an section including the central level.

The width of the slice level d0 including the central level is the smallest, and those of the slice levels d1(1), d2(1), d3(1), and d4(1) closer to the highest level are smaller in this order. In addition, the widths of the slice levels d1(2), d2(2), d3(2), and d4(2) closer to the lowest level are smaller in this order. The slice levels d1(1) and d1(2) are equal in width, and the slice levels d2(1) and d2(2) are equal in width. Further, the slice levels d3(1) and d3(2) are equal in width, and the slice levels d4(1) and d4(2) are equal in width. Namely, a graph (function) represented by a set of the slice levels d0, d1(1) to d4(1), and d1(2) to d4(2) is symmetric about an origin (0, 0). However, the present invention is not limited to this, and the slice levels d1(1) and d1(2), for example, may not be equal in width.

If the received power is higher than the certain level β, that is, at least one of the pre-Viterbi pseudo BER, the post-Viterbi pseudo BER, and the hard decision BER is estimated to be lowered by a factor other than the reduction in the received power ("YES" at the step S4) or after a step S5, the slice level control section 24 determines whether the number of fingers detected by the number-of-fingers detection section 21a is greater than a preset value γ (at a step S6).

If the number of fingers is greater than the preset value γ (i.e., it is estimated that many multipaths that are reflected waves are present) ("YES" at the step S6), the slice level control section 24 distributes the slice levels d0 to d4(2) nonlinearly, that is, gives a certain weight to the width of each of the slice levels d0 to d4(2) (at a step S7) (refer to FIG. 6). The slice level control section 24 may, for example, prepare a plurality of setting patterns for the slice level widths in advance and adopt a pattern with which the pre-Viterbi pseudo BER, the post-Viterbi pseudo BER, and the hard decision BER are suitable, or may dynamically change the width of each slice level using an arbitrary algorithm and adopt the width of the slice level with which the pre-Viterbi pseudo BER, the post-Viterbi pseudo BER, and the hard decision BER are suitable. When changing the width of each slice level, the AGC gain or the received power may be used. The AFC frequency may be used. The AFC frequency may be used. The pre-Viterbi pseudo BER, the post-Viterbi pseudo BER, the hard decision BER may be used.

If the number of fingers is equal to or smaller than the certain value γ (it is estimated, for example, that the number of multipaths is small but that the quality of the transmission line is bad due to fading, noise, or the like) ("NO" at the step S6), the slice level control section 24 gives a certain weight to the width of each slice level using, for example, the same scheme stated above or a other different scheme (at a step S8).

The slice level width change processing may be performed by a CPU 33 arranged outside of the CDM/FEC section 13 as shown in FIG. 2 instead of the slice level control section 24. In this case, the CPU 33 receives the above-stated various pieces of information through the slice level control section 24, calculates an appropriate width of each slice level, and writes the calculated width to the register (not shown) included in the slice level control section 24. Alternatively, not the CPU 33 but an external apparatus connected to the receiver through a man-machine interface (MMI) 34 provided in the receiver may perform the slice level width calculation. In this case, the external apparatus receives these pieces of information through the slice level control section 24 and the MMI 34, calculates an appropriate width of each slice level, writes the calculated width to the register (not shown) included in the slice level control section 24 through the MMI 34.

In the embodiment of the present invention described above, the slice level control section 24 calculates soft decision data after the bit de-interleave is performed by the bit I/L 23 as shown in FIG. 2. Alternatively, a processing order may be reversed.

As stated so far, according to the embodiment of the present invention, if at least one of the pre-Viterbi pseudo BER, the post-Viterbi pseudo BER, and the hard decision BER does not satisfy the predetermined level, each threshold interval (the width of each slice level) is changed. It is, therefore, possible to reduce bit errors and acquire a high coding gain, accordingly.

Further, according to the embodiment of the present invention, if the AGC gain, the AFC frequency, and the number of fingers do not satisfy their respective levels, each threshold interval is changed. It is, therefore, possible to correct the threshold interval in a more appropriate direction.

What is claimed is:

1. A decoder for decoding a demodulated signal that has been subjected to a code division multiplex (CDM) demodulation, the decoder comprising:
a Viterbi decoding section that subjects a convolutional code to a soft decision Viterbi decoding;
a soft decision data acquisition section that acquires soft decision data corresponding to an interval to which the demodulated signal belongs, using soft decision information in which a plurality of intervals obtained by dividing between a highest level and a lowest level according to a plurality of thresholds correspond to pieces of soft decision data to be input to the Viterbi decoding section, respectively; and
a threshold changing section that determines whether a situation of a transmission line is suitable, and that changes threshold intervals in the soft decision information if the state of the transmission line does not satisfy a predetermined reference.

2. The decoder according to claim 1, further comprising:
a convolutional coding section that conducts a convolutional coding to the signal that has been subjected to the soft decision Viterbi decoding; and
a comparison section that compares the signal obtained by conducting a hard decision to the soft decision data with an output signal from the convolutional coding section, wherein
the threshold changing section determines whether the situation of the transmission line is suitable based on a result of a comparison by the comparison section.

3. The decoder according to claim 2, wherein
the comparison section calculates a bit error rate that indicates a rate of different bits between the two signals.

4. The decoder according to claim 1, further comprising:
a block decoding section that block-decodes the signal that has been subjected to the soft decision Viterbi decoding; and
further comparison section that compares the signal that has been subjected to the soft decision Viterbi decoding with an output signal from the block decoding section, wherein
the threshold changing section determines whether the situation of the transmission line is suitable based on a result of a comparison by the further comparison section.

5. The decoder according to claim 4, wherein
the further comparison section calculates a bit error rate that indicates a rate of different bits between the two signals.

6. The decoder according to claim 1, wherein
the threshold changing section sets a threshold interval that includes a central level between the highest level and the lowest level to be widest, and sets threshold intervals narrower, the more they are closer to the highest level or the lowest level from the central level.

7. The decoder according to claim 1, wherein
the threshold changing section changes the threshold intervals according to a setting pattern given in advance.

8. A receiver comprising:
a code division multiplex (CDM) demodulation section that demodulates a CDM-modulated signal and that outputs a demodulated signal;
a Viterbi decoding section that subjects a convolutional code to a soft decision Viterbi decoding;
a soft decision data acquisition section that acquires soft decision data corresponding to an interval to which the demodulated signal belongs, using soft decision information in which a plurality of intervals obtained by dividing between a highest level and a lowest level according to a plurality of thresholds correspond to pieces of soft decision data to be input to the Viterbi decoding section, respectively; and
a threshold changing section that determines whether a situation of a transmission line is suitable, and that changes threshold intervals in the soft decision information if the state of the transmission line does not satisfy a predetermined reference.

9. The receiver according to claim 8, further comprising:
a convolutional coding section that conducts a convolutional coding to the signal that has been subjected to the soft decision Viterbi decoding; and
a comparison section that compares the signal obtained by conducting a hard decision to the soft decision data with an output signal from the convolutional coding section, wherein
the threshold changing section determines whether the situation of the transmission line is suitable based on a result of a comparison by the comparison section.

10. The receiver according to claim 9, wherein
the comparison section calculates a bit error rate that indicates a rate of different bits between the two signals.

11. The receiver according to claim 8, further comprising:
a block decoding section that block-decodes the signal that has been subjected to the soft decision Viterbi decoding; and
further comparison section that compares the signal that has been subjected to the soft decision Viterbi decoding with an output signal from the block decoding section, wherein
the threshold changing section determines whether the situation of the transmission line is suitable based on a result of a comparison by the further comparison section.

12. The receiver according to claim 11, wherein
the further comparison section calculates a bit error rate that indicates a rate of different bits between the two signals.

13. The receiver according to claim 8, wherein
the threshold changing section sets a threshold interval that includes a central level between the highest level and the lowest level to be widest, and sets threshold intervals narrower, the more they are close to the highest level or the lowest level from the central level.

14. The receiver according to claim 8, wherein
the threshold changing section changes the threshold intervals according to a setting pattern given in advance.

15. The receiver according to claim 8, wherein
the CDM demodulation section comprises a hard decision section that conducts a hard decision to the demodulated signal, and that compares a signal obtained by the hard decision with a signal given in advance, and
the threshold changing section determines whether the situation of the transmission line is suitable based on a result of a comparison by the hard decision section.

16. The receiver according to claim 15, wherein
the hard decision section calculates a bit error rate that indicates a rate of different bits between the two signals.

17. The receiver according to claim 8, wherein
the CDM demodulation section comprises a number-of-fingers detection section that detects the number of fingers, and
the threshold changing section determines whether the state of the transmission line is suitable based on the number of fingers.

18. The receiver according to claim 8, wherein
a power level of the CDM-modulated signal input to the CDM demodulation section is adjusted by an automatic gain control (AGC) circuit,
the CDM demodulation section comprises a gain detection section that detects a power gain by the AGC circuit, and
the threshold changing section determines whether the state of the transmission line is suitable based on the power gain.

19. The receiver according to claim 8, wherein
the CDM demodulation section comprises a frequency detection section that detects a frequency of an oscillation signal used to down-convert a signal of a radio frequency received by a tuner through an antenna, a generating of the oscillation signal being controlled by an automatic frequency control (AFC) circuit based on the signal of the radio frequency, the down-converted signal being subjected to the CDM de-modulation and
the threshold changing section determines whether the state of the transmission line is suitable based on the frequency of the oscillation signal.

20. A decoder for decoding a demodulated signal that has been subjected to a code division multiplex (CDM) demodulation, the decoder comprising:
a Viterbi decoding section that subjects a convolutional code to a soft decision Viterbi decoding;
a soft decision data acquisition section that acquires soft decision data corresponding to an interval to which the demodulated signal belongs, using soft decision information in which a plurality of intervals obtained by dividing between a highest level and a lowest level according to a plurality of thresholds correspond to pieces of soft decision data to be input to the Viterbi decoding section, respectively; and
a threshold change request section that determines whether a situation of a transmission line is suitable, that issues a request to execute a new calculation of threshold intervals if the situation of the transmission line does not satisfy a predetermined reference, and that changes the threshold intervals in the soft decision information based on a calculation result if receiving the calculation result in response to the request.

* * * * *